United States Patent [19]
Fujiu et al.

[11] Patent Number: 5,796,000
[45] Date of Patent: Aug. 18, 1998

[54] VIBRATION ANGULAR-VELOCITY SENSOR AND PROCESS FOR PRODUCING IT

[75] Inventors: Takamitsu Fujiu, Zama; Shunji Watanabe, Setagaya-ku; Yoshinori Sango, Machida; Tatsushi Nomura, Kawasaki, all of Japan

[73] Assignee: Nikon Corporation

[21] Appl. No.: 674,708

[22] Filed: Jul. 2, 1996

Related U.S. Application Data

[63] Continuation of Ser. No. 306,226, Sep. 14, 1994, abandoned.

[30] Foreign Application Priority Data

| Sep. 14, 1993 | [JP] | Japan | 5-228719 |
| Oct. 15, 1993 | [JP] | Japan | 5-25102 |
| Nov. 29, 1993 | [JP] | Japan | 5-298032 |
| Dec. 1, 1993 | [JP] | Japan | 5-301668 |
| Dec. 27, 1993 | [JP] | Japan | 5-330736 |

[51] Int. Cl.$^6$ .................................................. G01P 3/02
[52] U.S. Cl. .............................. 73/504.15; 310/329
[58] Field of Search ........................... 73/504.12, 504.13, 73/504.14, 504.15, 504.16, 514.34, 514.36; 310/328, 331, 366, 332, 329, 333

[56] References Cited

U.S. PATENT DOCUMENTS

| 3,143,889 | 8/1964 | Simmons et al. | 73/504.12 |
| 3,219,850 | 11/1965 | Langevin | 73/504.15 |
| 3,520,195 | 7/1970 | Tehon | 73/504.14 |
| 3,842,294 | 10/1974 | Doi et al. | 310/333 |
| 4,689,992 | 9/1987 | Strachan | 73/504.12 |
| 4,836,023 | 6/1989 | Oikawa | 73/504.14 |
| 5,170,089 | 12/1992 | Fulton | 310/328 |
| 5,212,985 | 5/1993 | Takanaka et al. | 73/504.12 |
| 5,216,315 | 6/1993 | Terada et al. | 73/504.16 |
| 5,336,960 | 8/1994 | Shimizu et al. | 73/504.12 |

FOREIGN PATENT DOCUMENTS

| 63-042417 | 2/1988 | Japan | 73/504.16 |

*Primary Examiner*—Christine K. Oda
*Attorney, Agent, or Firm*—Pennie & Edmonds LLP

[57] ABSTRACT

A vibrator is formed on a silicon substrate to become a base by the silicon-processing procedure and a thin film of a piezoelectric material is formed on the substrate by a method matching with the silicon-processing procedure. When an ac field of a frequency near the resonance frequency of the transverse vibration of the vibrator is applied to the thin film of the piezoelectric material, the piezoelectric reverse effect excites characteristic vibration in the vibrator. If a rotational motion is generated along the axis of the beam in that state, the Coriolis' force is generated in a direction perpendicular to both the axial direction and the vibration direction of the beam. This force deforms the beam in that direction. Detecting inductive charges produced in another piezoelectric thin film fixed on the vibrator because of the piezoelectric normal effect due to the deformation, the rotational, angular velocity can be obtained.

4 Claims, 11 Drawing Sheets

VIBRATION ANGULAR-VELOCITY SENSOR AND PROCESS FOR PRODUCING IT

This is a continuation, of application Ser. No. 08/306, 226, filed Sep. 14, 1994, now abandoned.

BACKGROUND OF THE INVENTION

1. Field of the Invention

The present invention relates to a compact vibration angular-velocity sensor for detecting an angular velocity utilizing vibration based on the normal and reverse piezoelectric effect, and a process for producing the vibration angular-velocity sensor at a low cost.

2. Related Background Art

There are two dominating types of conventional vibration angular-velocity sensors utilizing the normal and reverse piezoelectric effect: the GE type and the Watson type.

Figure 1:
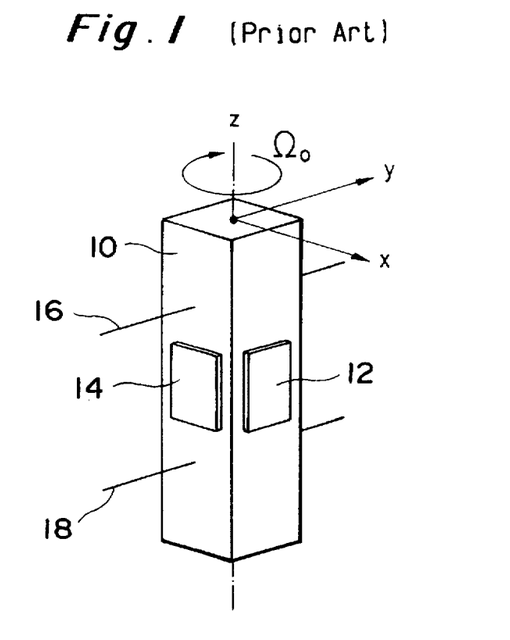
FIG. 1 is a perspective view to show a vibration angular-velocity sensor of the GE type as a conventional example.

The vibration angular-velocity sensor of the GE type is so arranged, as shown in FIG. 1, that piezoelectric ceramic plates 12, 14 are bonded to a rod vibrator 10 made of a metal, the vibrator is driven by the piezoelectric ceramic plate 12, and the piezoelectric ceramic plate 14 detects the Coriolis' force appearing upon rotation of the vibrator 10 at an angular velocity $\Omega_0$. The vibration mode used is the nonrestraint, transverse vibration, and the vibrator 10 is normally fixed to a base at nodes 16, 18 of vibration.

Figure 2:
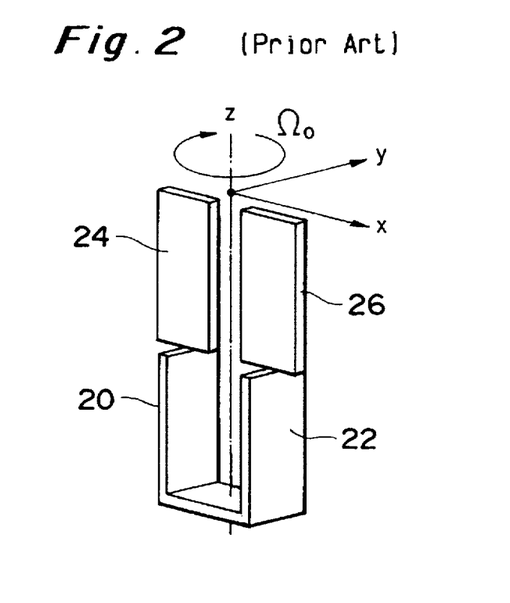
FIG. 2 is a perspective view to show a vibration angular-velocity sensor of the Watson type as another conventional example.

The vibration angular-velocity sensor of the Watson type is so arranged, as shown in FIG. 2, that four piezoelectric ceramic bimorphs 20 to 26 are arranged in the shape of such a tuning fork that two of them are set on the other two as perpendicular thereto, the drive bimorphs 20, 22 vibrate the entire fork, and the detection bimorphs 24, 26 detect the Coriolis' force caused by rotation at the angular velocity $\Omega_0$.

These vibration angular-velocity sensors are applied to hand vibration sensors, for example.

It has been, however, impossible that these vibration angular-velocity sensors were produced in a compact size and at a low cost, because the structure of the vibrator and the method for fixing it were complex and because complicated steps are necessary for bonding of the ceramic plates, mounting of lead wires, etc.

SUMMARY OF THE INVENTION

An object of the present invention is to provide a vibration angular-velocity sensor compact in size and low in cost, and a process for producing it, solving the above problems.

Provided according to the present invention is a vibration angular-velocity sensor comprising a rod vibrator formed by a silicon-processing procedure, a base formed by a silicon-processing procedure to support the vibrator, a first thin film made of a piezoelectric material and formed on the vibrator, for exciting vibration of the vibrator with application of an ac voltage, and a second thin film made of a piezoelectric material and formed on the vibrator, for detecting vibration of the vibrator in a direction perpendicular to a direction of the vibration excited with the application of the ac voltage.

Also provided according to the present invention is a process for producing a vibration angular-velocity sensor which comprises a rod vibrator, a base supporting the vibrator, a first thin film made of a piezoelectric material and formed on the vibrator, for exciting vibration of the vibrator with application of an ac voltage, and a second thin film made of a piezoelectric material and formed on the vibrator, for detecting vibration of the vibrator in a direction perpendicular to a direction of the vibration of the vibrator excited with the application of the ac voltage, comprising a step of forming a thin film of a first electrode material on a base of a single crystal material, a step of performing anisotropic etching of the single crystal material to form the vibrator made of the single crystal material, a step of forming a thin film of a piezoelectric material on the thin film made of the first electrode material, and a step of forming a thin film of a second electrode material on the thin film made of the piezoelectric material.

The present invention is based on an idea that the silicon-processing procedure can be combined with the vapor phase deposition of a piezoelectric or electrostrictive material recently becoming popular, as means for producing the vibration angular-velocity sensor. A vibrator is formed on a silicon substrate to become a base by the silicon-processing procedure and a thin film of a piezoelectric or electrostrictive material is formed on the substrate by a method matching with the silicon-processing procedure. The vibrator is formed as a cantilever beam or a double-sided beam supported on the base.

When an ac field of a frequency near the resonant frequency of the transverse vibration of the vibrator is applied to the thin film of the piezoelectric or electrostrictive material, the piezoelectric reverse effect excites characteristic vibration in the vibrator. If a rotational motion is generated along the axis of the beam in that state, the Coriolis' force is generated in a direction perpendicular to both the axial direction and the vibration direction of the beam. This force deforms the beam in the above direction perpendicular to the vibration direction. Detecting inductive charges produced in another piezoelectric or electrostrictive thin film fixed on the vibrator because of the piezoelectric normal effect due to the deformation, the rotational, angular velocity can be obtained by the following relation.

$$F_c = 2mV \times \Omega \tag{1}$$

Here, $F_c$ is the Coriolis' force, m a mass of the vibrator, V the vibration velocity of the vibrator, and $\Omega$ the rotational, angular velocity. Further, "x" means an outer product of vectors.

Preferably, the thin film of the piezoelectric or electrostrictive material formed directly or through another layer such as an electrode on the vibrator is formed by a method matching with the silicon-processing procedure, for example by the vapor phase deposition such as the sputtering, the vacuum deposition, the EB evaporation (electron beam evaporation), the MOCVD process, etc.

Since the silicon-processing procedure, typified by the photolithography and the anisotropic chemical etching, is basically a two-dimensional processing procedure, the vibrator should preferably have a two-dimensionally processable shape in order to produce the vibrator at a low cost. For that, it is preferred that the thin film of the piezoelectric or electrostrictive material and the electrodes for extracting the piezoelectric effect from the thin film be formed in parallel with the silicon wafer surface.

The detection electrodes output signals in each of which a piezoelectric signal due to the vibration of the beam is added to a piezoelectric signal caused by the Coriolis' force. With application of the Coriolis' force, the beam is deflected in the direction perpendicular to the vibration direction, so that a compressive stress is applied on one side while a tensile stress on the other side in symmetry with each other with respect to the center surface of the beam. If the detection electrodes are arranged in symmetry with each other with respect to the center axis of the beam, the piezoelectric signals caused by the Coriolis' force from the two electrodes have an equal absolute value and opposite signs. Since the piezoelectric signals based on the vibration of the beam are equal in the two electrodes, only a signal caused by the Coriolis' force can be obtained by taking a difference between the two outputs obtained from the both electrodes.

To further simplify the device, replacing the separate formation of piezoelectric or electrostrictive thin films for drive and for detection, a preferable arrangement is such that divided electrodes are arranged for a single piezoelectric or electrostrictive thin film to use part of the film for drive and the other part for detection.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8A to FIG. 17B are drawings to show a process for fabricating the vibration angular-velocity sensor shown in FIG. 6;

DESCRIPTION OF THE PREFERRED EMBODIMENTS

Figure 3:
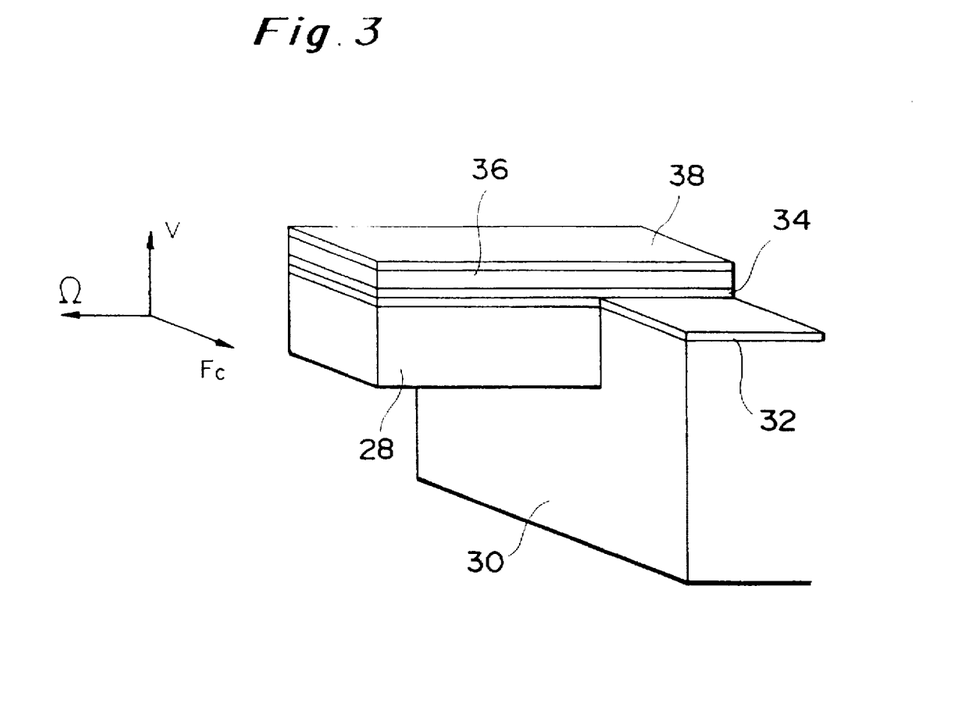
FIG. 3 is a perspective view to show a vibration angular-velocity sensor of an embodiment of the present invention.
Figure 4:
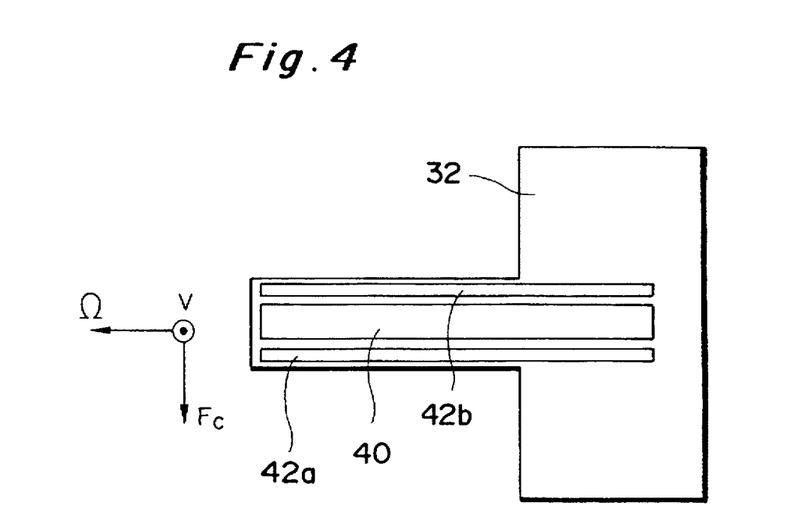
FIG. 4 is a top plan view of a cross section obtained by cutting the vibration angular-velocity sensor shown in FIG. 3 by a plane of a lower electrode.

The present invention will be described in more detail with the embodiments. FIG. 3 shows an example of the vibration angular-velocity sensor based on the present invention. A cantilever vibrator 28 made of silicon is fixed to a silicon base 30. A silicon nitride film 32 is formed on the top surface of the silicon base. Further, a platinum lower electrode 34, a lead zirconate titanate (PZT) piezoelectric film 36, and a platinum upper electrode 38 are successively formed on the film 32. FIG. 4 is a top plan view of the device cut by the plane of the platinum lower electrode 34.

The lower electrode 34 is divided into three segments, which are a drive electrode 40 and detection electrodes 42a, 42b. Using the upper electrode 38 as the common ground and applying an electric field of a frequency near the natural frequency of cantilever of the vibrator to the drive electrode 40, vibration of the PZT piezoelectric film 36 excites cantilever vibration in the direction shown by V in the drawing. When the vibrator moves at the speed V in the direction of V and when a rotational, angular velocity $\Omega$ is applied about the axis of the cantilever in the axial direction thereof, the Coriolis' force $F_c$ works on the vibrator in accordance with the formula (1). This force deflects the vibrator in the direction perpendicular to the direction of vibration. When the force is applied in the direction shown by $F_c$, in FIG. 4, a compressive stress acts on the detection electrode 42a while a tensile stress on the detection electrode 42b. Letting $v_a$ be a voltage detected between the detection electrode 42a and the ground and $v_b$ be a voltage detected between the detection electrode 42b and the ground, the voltages $v_a$, $v_b$ each are detected in the form of a synthetic signal between the signal caused by the Coriolis' force and the signal caused by the cantilever vibration. Since the signals due to the Coriolis' force have opposite signs between $v_a$ and $v_b$, taking a difference $v_a-v_b$ between them cancels the signals caused by the cantilever vibration, whereby only the signals due to the Coriolis' force can be read.

Figure 5:
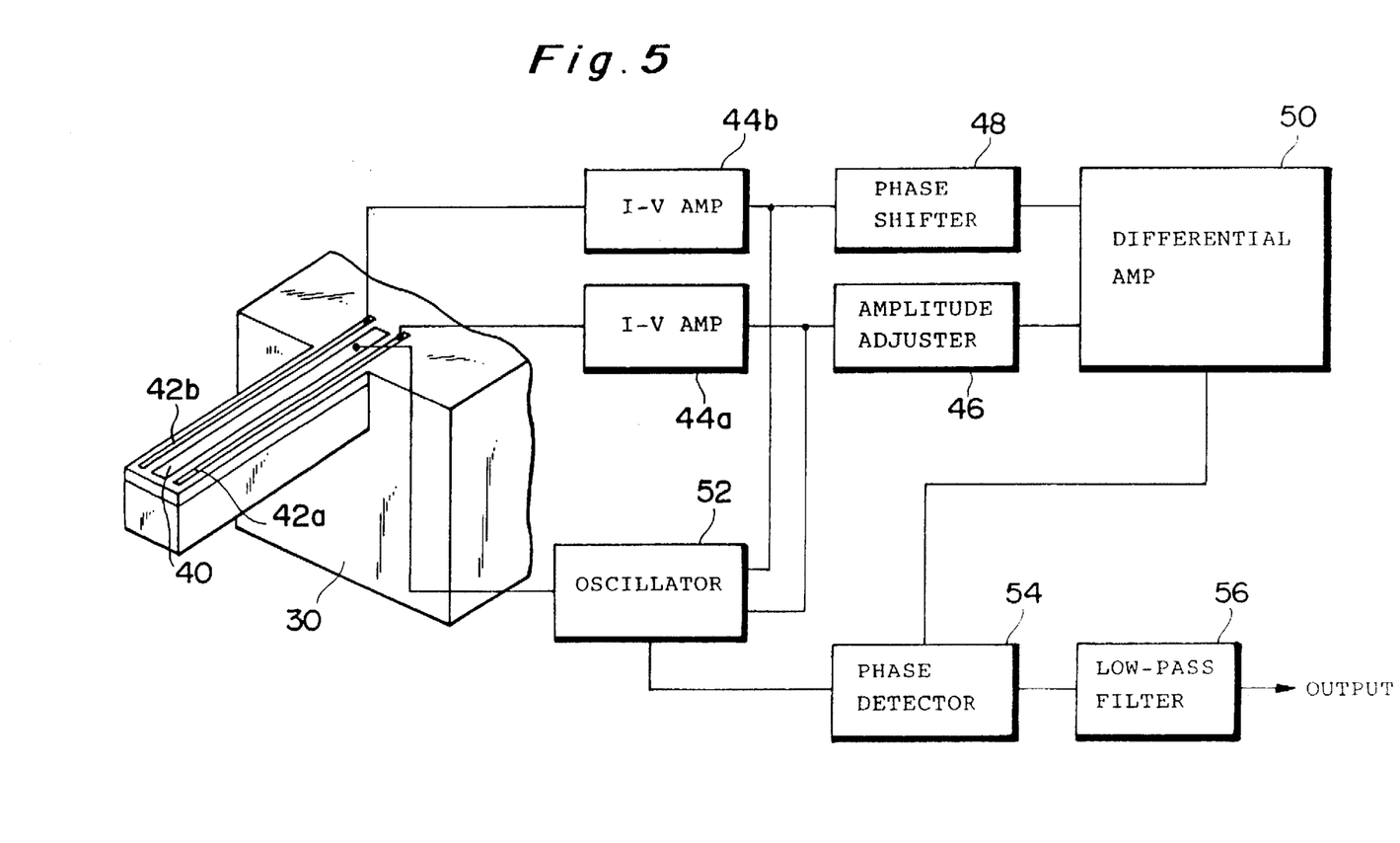
FIG. 5 is a block diagram to show the structure of an electric circuit.

FIG. 5 is a block diagram to show the structure of an electric circuit. An I-V amplifier 44a or 44b is connected with the detection electrode 42a or 42b, respectively, whereby a current output is converted into a voltage output. An output of the I-V amplifier 44a or 44b is connected with an amplitude adjustor 46 or with a phase shifter 48, respectively, whereby the amplitude and phase of outputs from the I-V amplifiers 44a, 44b are made equal to each other. That is, the amplitude of the output from the I-V amplifier 44a is made equal to that from the I-V amplifier 44b, while the phase of the output from the I-V amplifier 44b is made equal to that from the I-V amplifier 44a. Then a differential amplifier 50 takes a difference between the two outputs and amplifies the difference. On the other hand, an oscillator 52 is operated in accordance with the outputs from the I-V amplifiers 44a, 44b to apply a drive voltage to the drive electrode 40. An output from the differential amplifier 50 is put together with an output from the oscillator 52 into a phase detector 54, and an output from the phase detector 54 is let to pass a low-pass filter 56 which removes high-frequency components, thus providing an output from the electric circuit.

Figure 6:
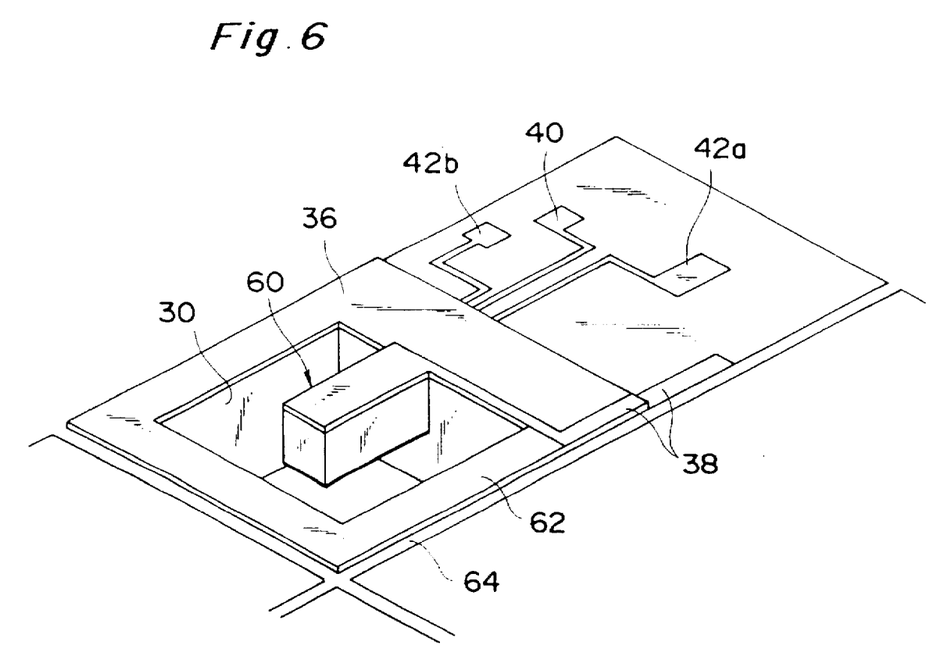
FIG. 6 is a perspective view to show an actual shape of a vibrator.
Figure 7:
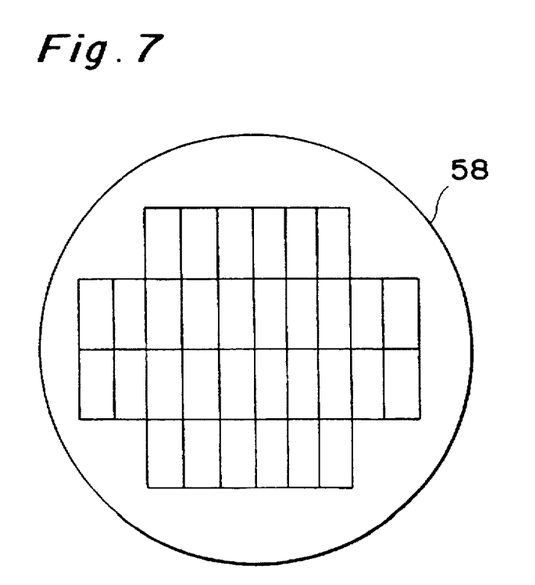
FIG. 7 is a plan view to show a wafer before cut, including devices with vibrators formed therein.

Further, FIG. 6 is a perspective view to show an actual shape of the vibrator 60. The PZT piezoelectric film 36 is formed on the silicon base 30 and the upper electrode 38 is formed on the PZT piezoelectric film 36. The drive electrode 40 and the detection electrodes 42a, 42b are formed between the silicon base 30 and the PZT piezoelectric film 36, part of which is shown in FIG. 6. The vibrator 60 shown in FIG. 6 is one cut out of a wafer 58 shown in FIG. 7. The vibrator 60 is formed in each of many rectangles shown in FIG. 7. A frame 62 around each vibrator 60 may be used as a protection portion as it is, or may be finally removed.

A material for the vibrator 60 is preferably a single crystal, preferably of silicon. In order to detect the Coriolis' force with good efficiency, the resonance frequency in the drive direction needs to be matched with the resonance frequency in the direction of the vibration due to the Coriolis' force. Accordingly, the cross section of the vibrator 60 is preferably a square, and, therefore, the vibrator 60 is preferably a regular, quadrangular prism. Here, the cross section of the vibrator 60 may be triangular, circular, etc.

Figure 8A:
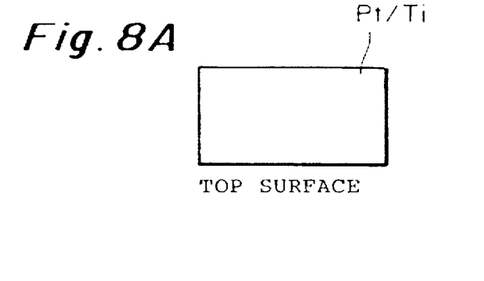
Figure 8B:
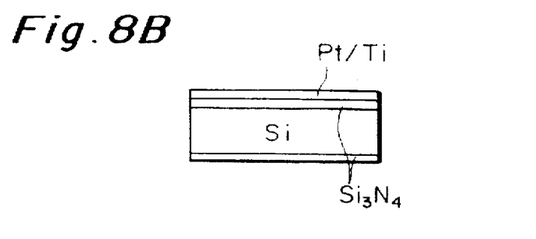

The process for fabricating the vibration angular-velocity sensor is next described referring to FIG. 8A to FIG. 17B. First, a film of silicon nitride ($Si_3N_4$) is formed by the CVD method on the both surfaces of a silicon wafer on which the surface (110) is exposed. Then a Pt/Ti film to become the lower electrode 34 is formed on one surface by the sputtering method. The state up to this step is shown in FIG. 8A and FIG. 8B. FIG. 8A is a top plan view and FIG. 8B is a side cross section, which are the same in the following.

Figure 9A:
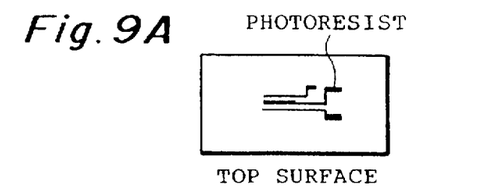
Figure 9B:
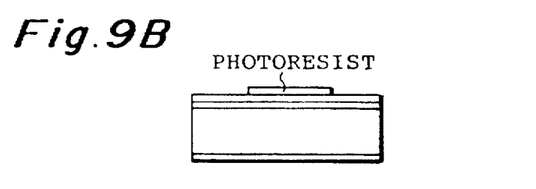
Figure 10A:
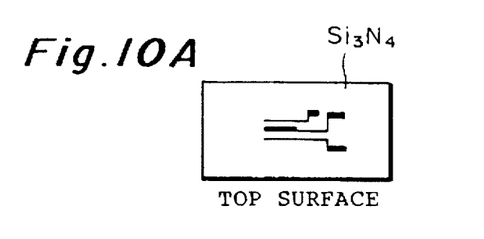
Figure 10B:
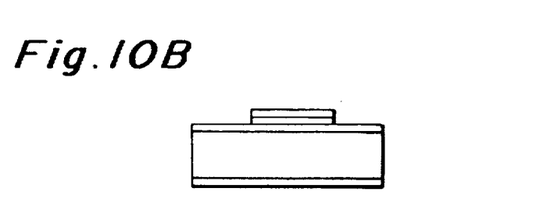
Figure 11A:
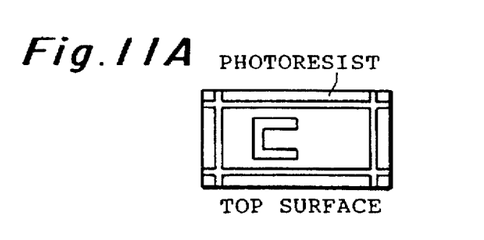
Figure 11B:
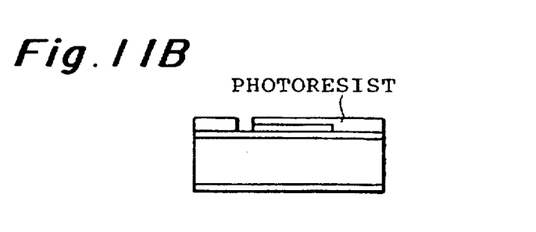
Figure 12A:
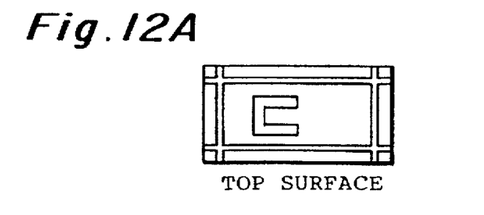
Figure 12B:
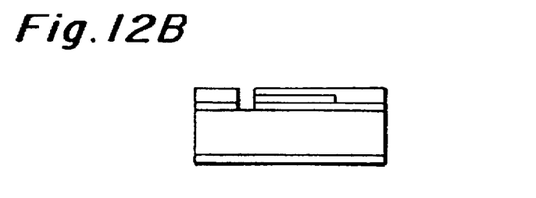
Figure 13A:
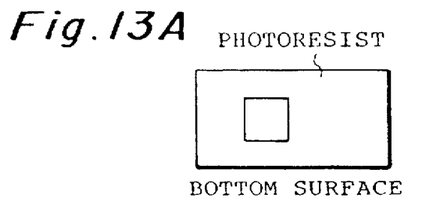
Figure 13B:
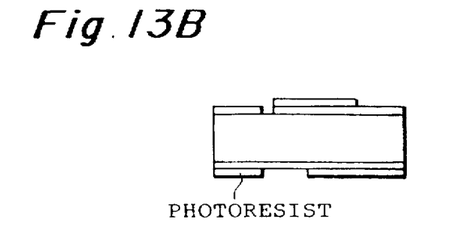
Figure 14A:
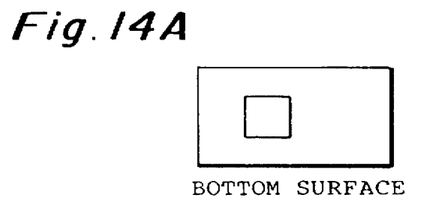
Figure 14B:
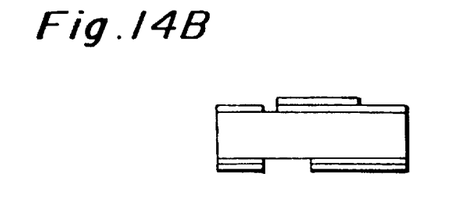

Next formed on the top surface of wafer by the photolithography is a resist pattern corresponding to the 3-part split electrode pattern to become the drive electrode 40 and the detection electrodes 42a, 42b, lead portions connected thereto, and wire bonding portions (FIGS. 9A and 9B). Further, the Pt/Ti film except for the portions covered by the resist pattern is removed by the reactive ion etching to expose the silicon nitride film of undercoat to the outside (FIGS. 10A and 10B). Then removed are a portion to become a space necessary for forming the cantilever and the portion 64 (FIG. 6) to be the border between the devices, and a photoresist is formed by the photolithography (FIGS. 11A and 11B). Silicon nitride on portions where the photoresist is not formed is removed by the reactive ion etching in the same manner as in FIGS. 10A and 10B (FIGS. 12A and 12B). A resist pattern is similarly formed on the bottom surface of the wafer (FIGS. 13A and 13B), and then silicon nitride on portions where the photoresist is not formed is removed by the reactive ion etching (FIGS. 14A and 14B). It is noted that FIGS. 13A and 14A show the bottom surface of the wafer.

Figure 15A:
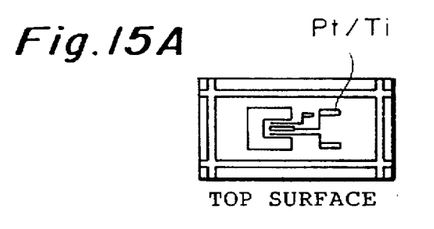
Figure 15B:
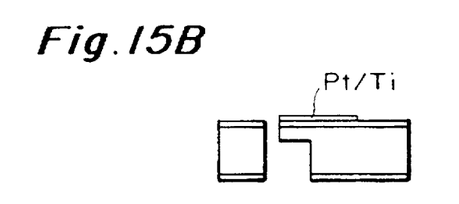
Figure 16A:
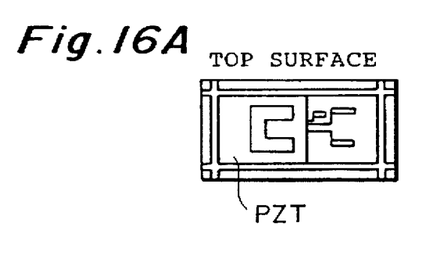
Figure 16B:
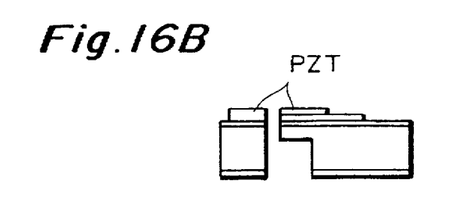
Figure 17A:
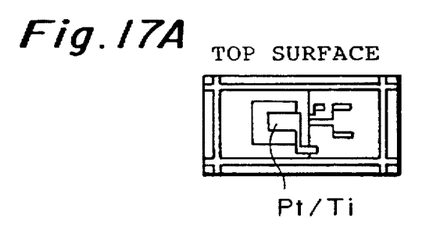
Figure 17B:
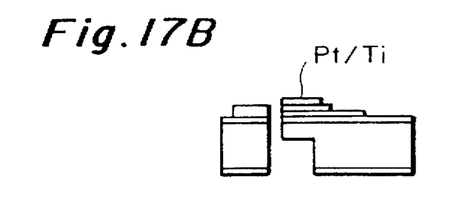

The thus processed silicon wafer is subjected to anisotropic etching with potassium hydroxide, so that etching progresses from portions without silicon nitride of a protection film against etching, thus obtaining the cantilever structure (FIGS. 15A and 15B). Then the PZT thin film is formed on portions around the cantilever by the sputtering method (FIGS. 16A and 16B). The upper electrode is finally formed by the mask vapor deposition to complete the device (FIGS. 17A and 17B). Connecting this device with the drive circuit and detection circuit as shown in FIG. 5, the vibration angular-velocity sensor is obtained.

Incidentally, silicon nitride is removed and silicon is suitably etched at the borders between the devices. Therefore, the devices can be easily separated from each other by breaking the wafer at the borders. If a film of a lead-base ferroelectric material is formed on silicon, the lead ferroelectric material would react with silicon in the process of film formation. Thus, a buffer layer is necessary for suppressing mutual atomic diffusion. Platinum is an excellent material with respect to this point and also functions as an electrode. A composite material between platinum and titanium or tantalum can improve adhesion between platinum and the silicon base.

Figure 18A:
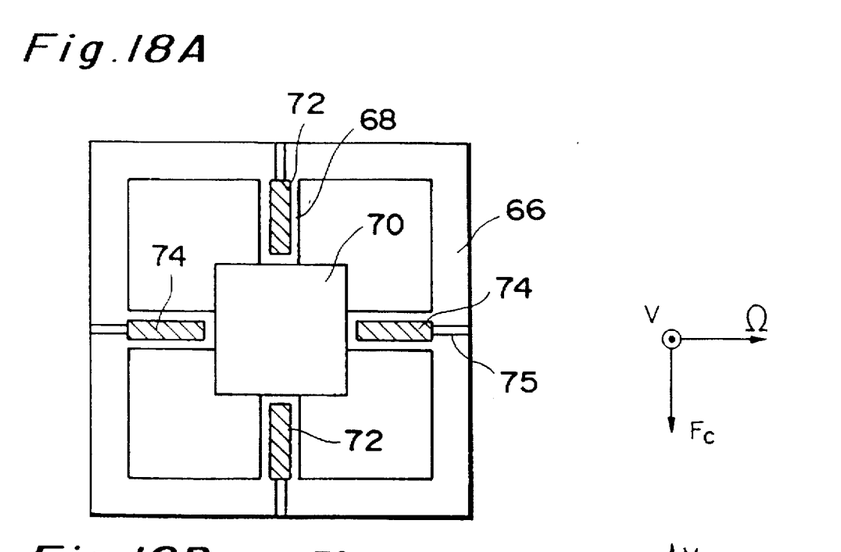
FIG. 18A and FIG. 18B are a plan view and a cross sectional side view to show another embodiment of the present invention.
Figure 18B:
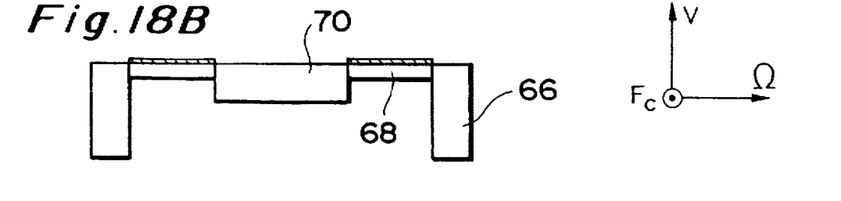

Another embodiment is next described referring to FIGS. 18A and 18B.

FIGS. 18A and 18B show a vibration angular-velocity sensor based on the present invention. A weight 70 made of silicon is fixed through four silicon beams 68 to a base 66 made of silicon. When an ac voltage of a frequency near the resonance frequency of the vibrator is applied to drive piezoelectric or electrostrictive thin films 72, the weight 70 and beams 68 vibrate in the direction shown by V in the drawing. In this state rotation about the axis shown by $\Omega$ produces the Coriolis' force expressed by the formula (1) in the direction of $F_c$. Deflection of the beams is detected as piezoelectric signals from detection piezoelectric or electrostrictive thin films 74.

Figure 19:
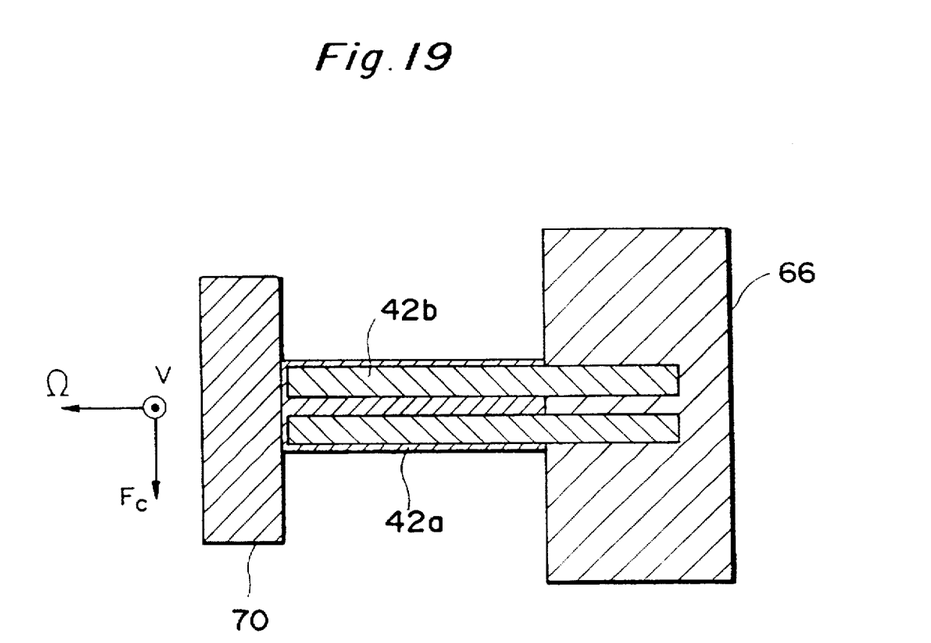
FIG. 19 is a drawing to illustrate the principle of operation of the vibration angular-velocity sensor shown in FIGS. 18A and 18B.

FIG. 19 is a top plan view of a cross section of the device obtained by cutting the beam 68 with the detection piezoelectric or electrostrictive thin film 74 formed thereon by the plane of the lower electrode, in which the lower electrode is split into two. In the drawing, with application of the Coriolis' force in the direction of $F_c$, a tensile stress acts on one segment 42b and a compressive stress on the other segment 42a. Similarly as in the previous embodiment, using the upper electrode as the ground and letting $v_a$ be a voltage detected between the detection electrode 42a and the ground and $v_b$ be a voltage detected between the detection electrode 42b and the ground, the voltages $v_a$–$v_b$ each are detected in the form of a synthetic signal between the signal due to the Coriolis' force and the signal due to the vibration of the beams. Since the signals due to the Coriolis' force have opposite signs between $v_a$ and $v_b$, the signals caused by the vibration of the cantilevers cancel each other by taking a difference $v_a$–$v_b$ between them, whereby only a signal due to the Coriolis' force can be read.

The structure of the beams 68 on which the drive piezoelectric or electrostrictive thin films are fixed is basically the same as that as described above except that the lower electrode is not split. Further, reference numeral 75 designates lead lines.

Figure 20A:
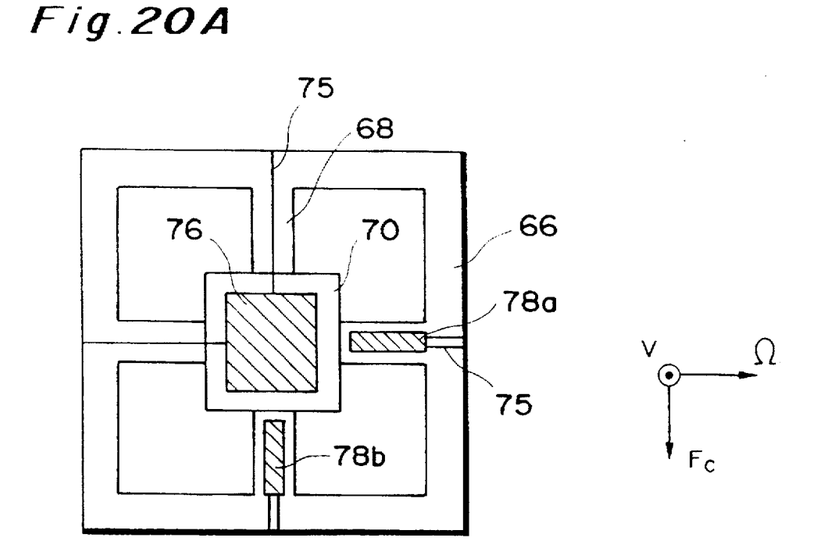
FIG. 20A and FIG. 20B are a plan view and a cross sectional side view to show another embodiment of the present invention.
Figure 20B:
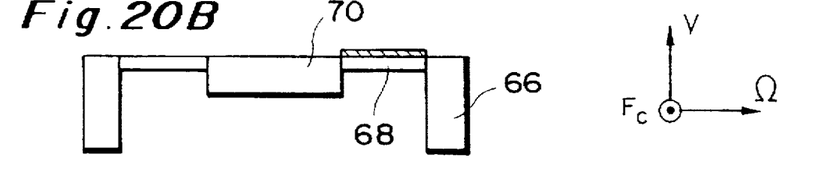

FIGS. 20A and 20B show another example of the vibration angular-velocity sensor based on the present invention. A weight 70 made of silicon is fixed through four silicon beams 68 to a base 66 made of silicon, and a drive piezoelectric or electrostrictive thin film 76 is formed on the top surface of the weight 70. Piezoelectric or electrostrictive thin films 78a, 78b for detecting rotational, angular velocities along two orthogonal axes are fixed on two orthogonal beams. When an ac voltage of a frequency near the resonance frequency of the vibrator is applied to the drive piezoelectric or electrostrictive thin film 76, the weight 70 and beams 68 vibrate in the direction shown by V in the drawing. In this state rotation about the axis shown by $\Omega$ produces the Coriolis' force expressed by the formula (1) in the direction of $F_c$. Deflection appearing in the beams 68 in the $\Omega$ direction is detected by the detection electrode 78a. With rotation about the beam 68 in the direction perpendicular to $\Omega$, deflection appearing in the beam 68 is also detected by the detection electrode 78b. Connecting the device with the electric circuit as shown in FIG. 5, rotational velocities in two orthogonal directions can be detected only by a single device. The detailed structure of the detection piezoelectric or electrostrictive thin films 78a, 78b is substantially the same as that as described with FIGS. 3 and 4.

As described above, the angular velocity sensor is so arranged that the vibrator is constructed of a plurality of beams 68 formed on a same plane and that the plurality of beams 68 are supported by the base 66 on the one side while supporting the weight 70 on the other side, whereby the mass increases as compared with vibrators without weight 70 so as to increase the Coriolis' force, having the effect of increasing the sensitivity.

Figure 21A:
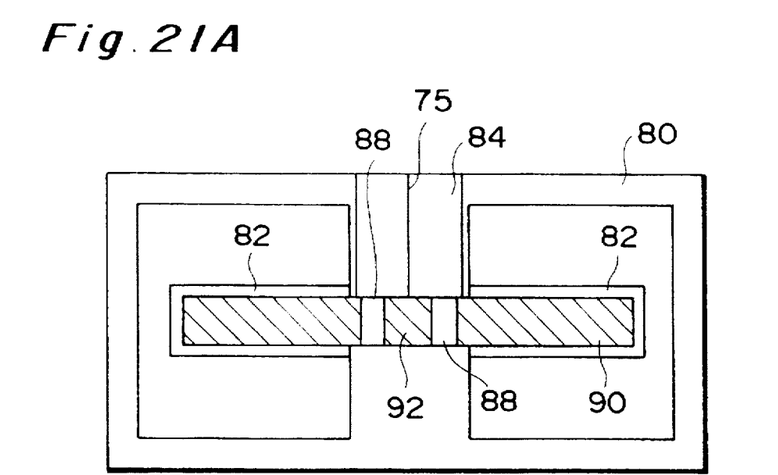
FIG. 21A and FIG. 21B are a plan view and a cross sectional side view to show another embodiment of the present invention.
Figure 21B:
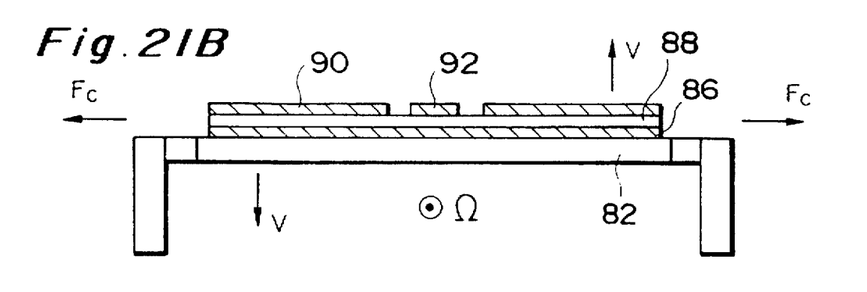

FIGS. 21A and 21B show another example of the vibration angular-velocity sensor based on the present invention.

FIG. 21A is a top plan view of the device and FIG. 21B is a cross section of the device obtained by cutting it by the center line of two beams in the direction perpendicular to the surface of device. Two silicon beams 82 are fixed through a silicon support 84 to a base 80 made of silicon. A lower electrode 86 is used as the common ground when a piezoelectric or electrostrictive thin film 88 is used for drive or for detection. The piezoelectric or electrostrictive thin film 88 is continuously formed on the two beams 82 and the support 84. Portions on the two beams, of the thin film 88 are used together with drive upper electrodes 90 for drive of the vibrator, while a portion on the support is used together with a detection upper electrode 92 for detection of the Coriolis' force. On this occasion, the piezoelectric or electrostrictive thin film 88 is polarized in the direction perpendicular to the thin film, using the upper and lower electrodes.

Applied to the drive electrodes 90 is an ac voltage of a frequency corresponding to the resonance in which the two beams 82 vibrate with the same amplitude but in mutually opposite directions along the direction perpendicular to the plane of the device. In this state, if rotation (at angular velocity of $\Omega$) occurs about the axis in the direction perpendicular to the beams 82 in the plane of the device, the Coriolis' forces expressed by the formula (1) act in the axial direction of the beams 82. Since the deflection direction (V) of one beam 82 is opposite to that of the other, the Coriolis' forces on the beams 82 act in mutually opposite directions ($F_c$). Because of the forces, the piezoelectric or electrostrictive thin film on the support is subject to compressive and tensile stresses in the direction of the axis of beams, whereby piezoelectric signals are generated through the lateral piezoelectric normal effect ($d_{31}$). In this case, the vibration of the two beams 82 is well balanced because the center of gravity is stationary as a whole upon vibration. Because of this, piezoelectric signals caused by the vibration of the beams 82 in the detection electrode 92 become as small as almost negligible. Thus, the compressive and tensile stresses due to the Coriolis' forces can be directly detected.

Figure 22A:
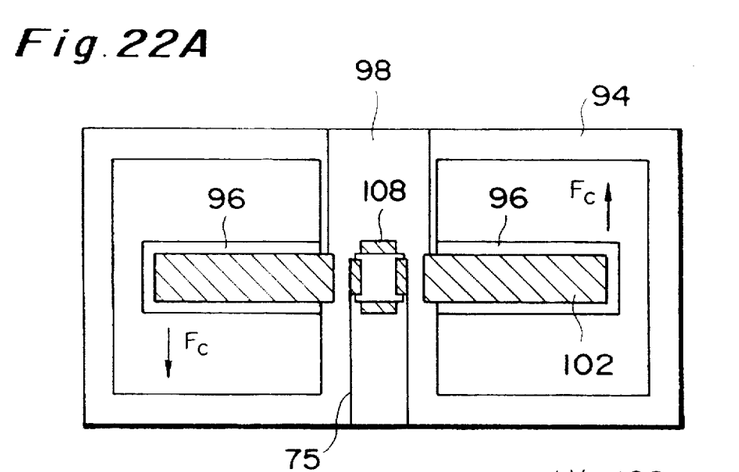
FIG. 22A and FIG. 22B are a plan view and a cross sectional side view to show another embodiment of the present invention.
Figure 22B:
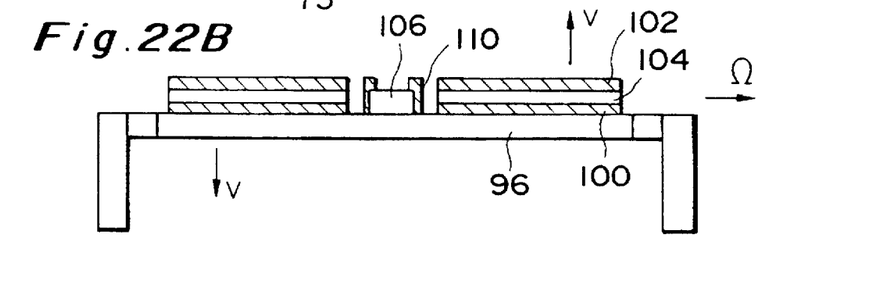

FIGS. 22A and 22B show another example of the vibration angular-velocity sensor based on the present invention. FIG. 22A is a top plan view of the device and FIG. 22B is a cross section of the device obtained by cutting it by the center line of two beams in the direction perpendicular to the plane of the device. Two silicon beams 96 are fixed through a silicon support 98 to a base 94 made of silicon. A drive piezoelectric or electrostrictive thin film 104 is formed on each beam 96 between a drive lower electrode 100 and a drive upper electrode 102. The thin films 104 are polarized in the direction perpendicular to the films, using the upper and lower electrodes 100, 102. A detection piezoelectric or electrostrictive thin film 106 is formed on the support 98 and is polarized in the direction connecting two electrodes 108, using the polarization electrodes 108. Detection electrodes 110 are arranged in the direction perpendicular to the polarization electrodes 108.

Applied to the drive electrodes 100, 102 is an ac voltage of a frequency corresponding to the resonance in which the two beams 96 vibrate with the same amplitude and in mutually opposite directions along the direction perpendicular to the plane of the device. In this state, if rotation (at angular velocity of $\Omega$) occurs about the axial direction of the beams 96, the Coriolis' forces expressed by the formula (1) act in the directions perpendicular to the beams 96 in the plane of the device. Since a deflection direction (V) of one beam 96 is opposite to that of the other beam, the Coriolis' forces act in mutually opposite directions ($F_c$). Because of the forces, the piezoelectric or electrostrictive thin film 106 on the support 98 receives a shearing stress about the axis perpendicular to the plane of the device, whereby piezoelectric signals are generated through the shearing piezoelectric normal effect ($d_{15}$). For this, the polarization treatment with the polarization electrodes is indispensable. Since the vibration of the two beams 96 is well balanced so that the center of gravity is stationary as a whole upon vibration, the piezoelectric signals caused by the vibration of the beams 96 in the detection electrodes 110 are as small as almost negligible, whereby the compressive and tensile stresses due to the Coriolis' forces can be directly detected.

As described above, the two beams are arranged in a same plane and in mutually opposite directions on a same straight line while sharing the support, which enables to excite vibration well balanced and less in energy loss.

The vibration angular-velocity sensor of the present invention can not only be used alone, but also be incorporated in a compact system such as a micro machine, a micro robot, etc.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 228719/1993 filed on Sep. 14, 1993, No. 258102/1993 filed on Oct. 15, 1993, No. 298032/1993 filed on Nov. 29, 1993, No. 301668/1993 filed on Dec. 1, 1993 and No. 330736/1993 filed on Dec. 27, 1993 are hereby incorporated by reference.

What is claimed is:

1. A vibration angular-velocity sensor comprising:
   a base made of silicon;
   a sensor portion made of silicon and projecting from said base, said sensor portion being continuously extending from said base, and a top surface of said sensor portion and a top surface of said base forming a flat plane;
   a SiN layer formed on said flat plane and having a flat surface, said SiN layer being located above both of at least one portion of said top surface of said sensor portion and at least one portion of said top surface of said base;
   a first electrode formed on a first predetermined area of said SiN layer and adapted to be connected with an AC voltage, said first electrode layer being located above both of at least one portion of said top surface of said sensor portion and at least one portion of said top surface of said base;
   a second electrode formed on a second predetermined area of said SiN layer and adapted to be connected with a detector, said second electrode layer being located above both of at least one portion of said top surface of said sensor portion and at least one portion of said top surface of said base;
   a piezoelectric layer formed on said first and second electrodes; and
   a conductive layer formed on said piezoelectric layer, said conductive layer being located above both of at least one portion of said top surface of said sensor portion and at least one portion of said top surface of said base,
   said first and second electrodes electrically and physically contacting with said piezoelectric layer.

2. A vibration angular-velocity sensor according to claim 1, wherein said second electrode comprises a pair of portions, and said first electrode is located between said pair portions.

3. A vibration angular-velocity sensor comprising:

a base made of silicon;

a sensor portion made of silicon and projecting from said base, said sensor portion being continuously extending from said base, and a top surface of said sensor portion and a top surface of said base forming a flat plane;

a first electrode formed on a first predetermined area of said top surfaces of said base and sensor portion and adapted to be connected with an AC voltage, said first electrode layer being located above both of at least one portion of said top surface of said sensor portion and at least one portion of said top surface of said base;

a second electrode formed on a second predetermined area of said top surfaces of said base and sensor portion and adapted to be connected with a detector, said second electrode layer being located above both of at least one portion of said top surface of said sensor portion and at least one portion of said top surface of said base;

a piezoelectric layer formed on said first and second electrodes; and a conductive layer formed on said piezoelectric layer, said conductive layer being located above both of at least one portion of said top surface of said sensor portion and at least one portion of said top surface of said base, said first and second electrodes electrically and physically contacting with said piezoelectric layer.

4. A vibration angular-velocity sensor according to claim 3, wherein said second electrode comprises a pair of portions, and said first electrode is located between said pair portions.

* * * * *

UNITED STATES PATENT AND TRADEMARK OFFICE
CERTIFICATE OF CORRECTION

PATENT NO. : 5,796,000

DATED : August 18, 1998

INVENTOR(S) : Takamitsu FUJIU, Shunji WATANABE, Yoshinori SANGO, Tatsushi NOMURA It is certified that error appears in the above-identified patent and that said Letters Patent is hereby corrected as shown below:

On title page,

On [30] Foreign Application Priority Data, line 2, change "5-25102" to --5-258102--.

Signed and Sealed this

First Day of December, 1998

*Attest:*

BRUCE LEHMAN

*Attesting Officer*  *Commissioner of Patents and Trademarks*